United States Patent [19]

Juve

[11] Patent Number: 4,527,508
[45] Date of Patent: Jul. 9, 1985

[54] HOIST-TYPE MATERIAL FINISHING LINE

[75] Inventor: Robert J. Juve, Sterling Heights, Mich.

[73] Assignee: McGraw-Edison Company, Rolling Meadows, Ill.

[21] Appl. No.: 493,671

[22] Filed: May 11, 1983

[51] Int. Cl.³ .......................... B05C 3/10; B65G 49/04
[52] U.S. Cl. ................... 118/425; 118/500; 118/697; 414/589; 414/750
[58] Field of Search ............... 118/425, 500, 501, 503, 118/697; 134/56 R, 57 R, 76, 77; 414/589, 749, 750-753; 198/342

[56] References Cited

U.S. PATENT DOCUMENTS 4,364,706 12/1982 Kranzlmüller .................. 414/749 X

FOREIGN PATENT DOCUMENTS 1475686 6/1977 United Kingdom ................ 198/342

Primary Examiner—Evan K. Lawrence
Attorney, Agent, or Firm—Robert C. Collins; Jon Carl Gealow; Hugh M. Gilroy

[57] ABSTRACT

A material finishing line which includes a plurality of finishing tanks disposed in a linear array and a self-propelled hoist movable along an elongated track extending parallel to the finishing line. The hoist includes a base which contains the propulsion and control mechanism, and a guide fixedly projecting upwardly from the base. A pick-up arm is slidably carried on the guide and is cantilevered therefrom over the finishing line so as to pass over successive tank locations as the hoist is propelled along the track. The pick-up arm is raised and lowered by an hydraulic ram coupled to the base, and is held in horizontal orientation by a pair of chains trained around sprockets affixed to the guide and attached to the pick-up arm.

20 Claims, 9 Drawing Figures

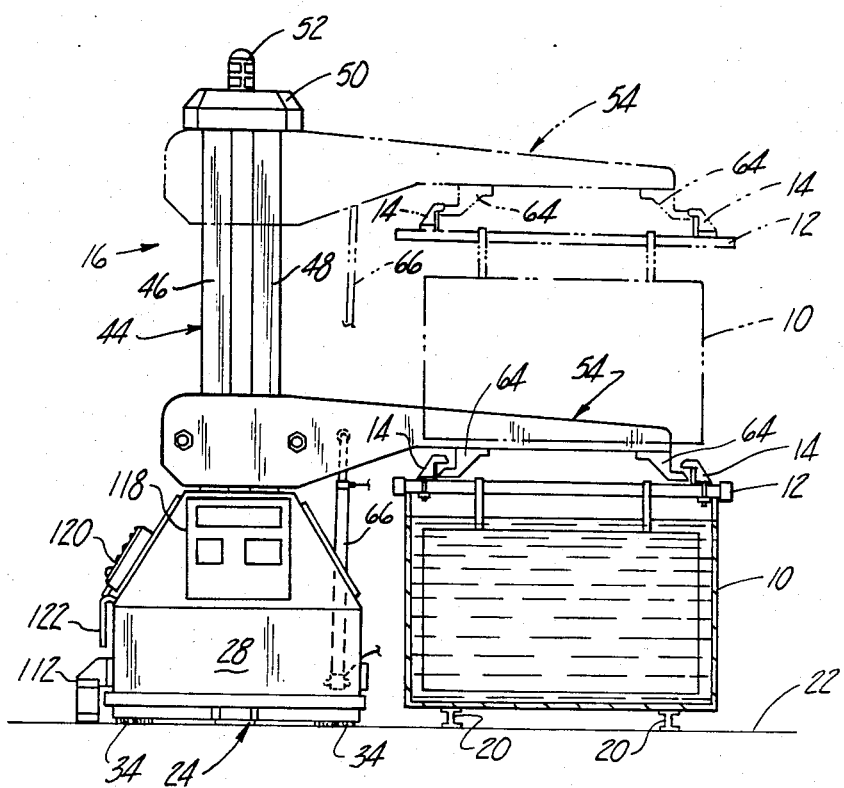
Fig-3
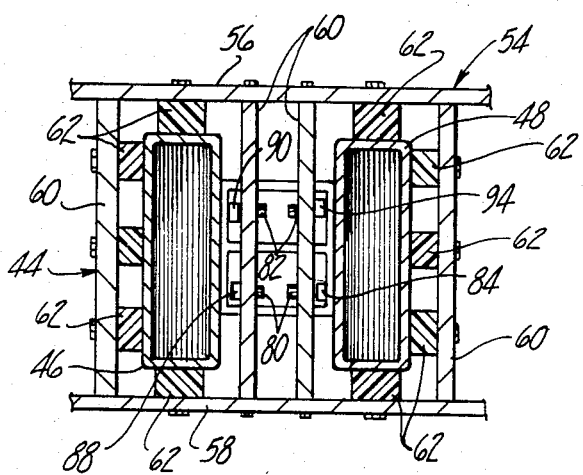
Fig-8
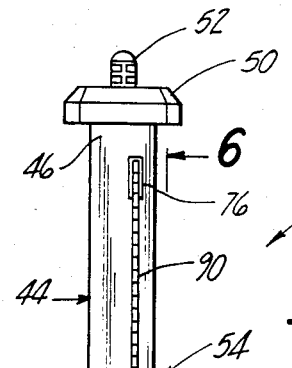
Fig-4
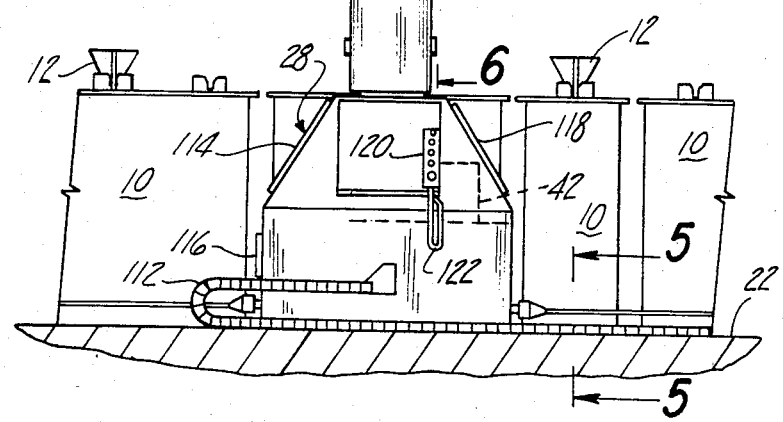

HOIST-TYPE MATERIAL FINISHING LINE

The present invention is directed to material finishing process lines, and more particularly to a hoist-type material finishing line and to an improved hoist for use therein.

An object of the present invention is to provide a hoist mechanism having particular application for use in material finishing lines which may be quickly installed, which is economical and reliable in operation, and which requires minimal dedicated floor space.

Another and related object of the invention is to provide a hoist mechanism of the described type which is self-propelled in operation and which requires minimum interconnection to an external power source.

A further object of the invention is to provide a hoist-type material finishing line, such as a metal plating line, which includes one or more improved hoists in accordance with the present invention. Yet another and more specific object of the invention is to provide a hoist-type material finishing line of the described type in which a minimum number of elements, and no elements receiving electrical or other power, are actually suspended or driven over the finishing line solution tanks.

The invention, together with additional objects, features and advantages thereof, will be best understood from the following description, the appended claims and the accompanying drawings in which:

FIG. 3 is an end elevational view of the hoist mechanism of the invention in operation in conjunction with a material finishing line;

FIG. 4 is a side view of the hoist and line as shown in FIG. 3;

FIG. 8 is a fragmentary sectional view taken generally along the line 8—8 in FIG. 6.

Figure 1:
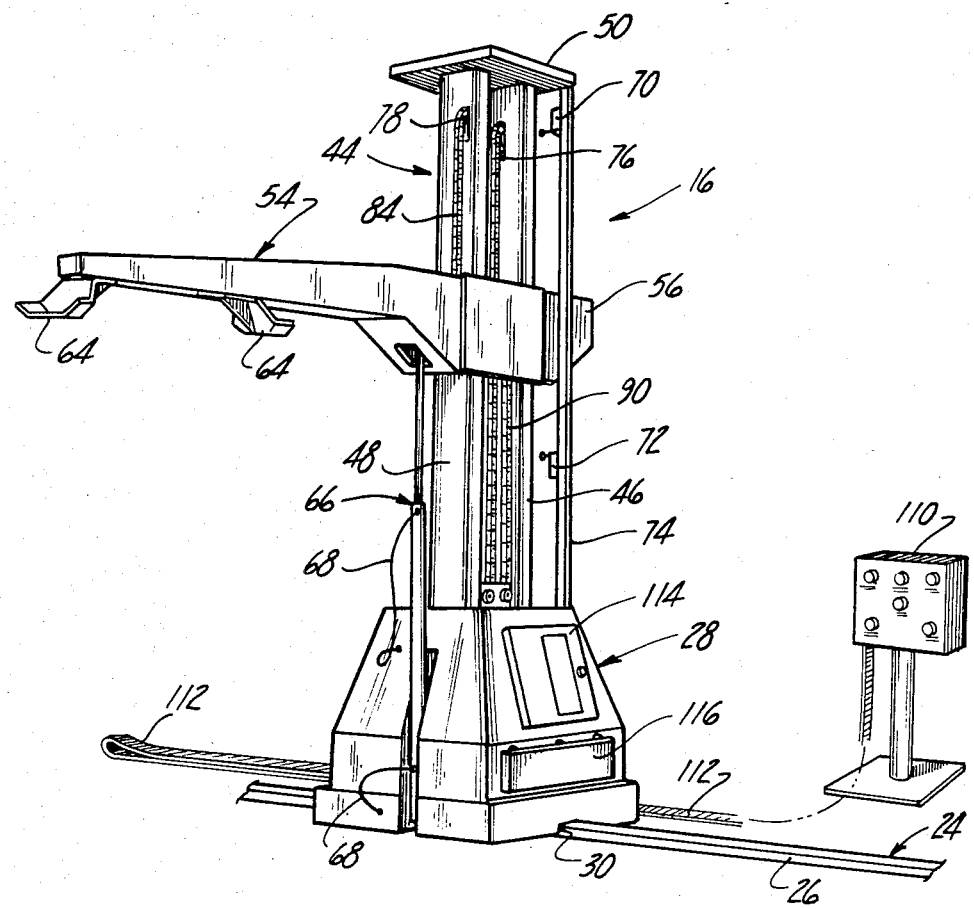
FIG. 1 is a perspective view of a self-propelled hoist mechanism provided in accordance with a presently preferred embodiment of the invention.
Figure 2:
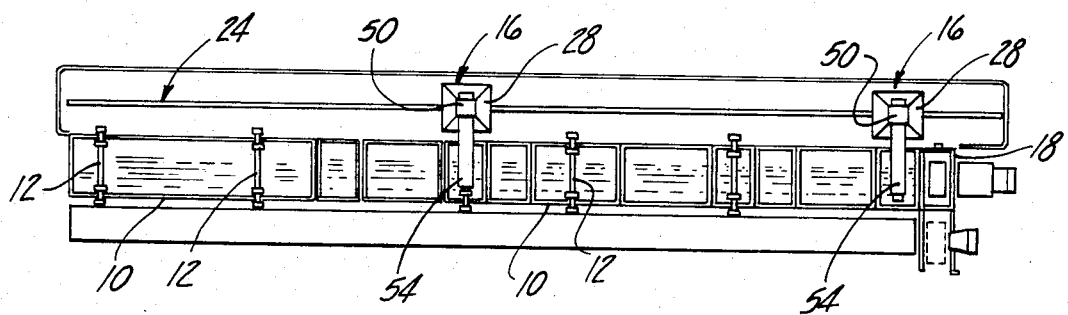
FIG. 2 is a schematic plan view of a material finishing line embodying a pair of hoist mechanisms in accordance with the invention.
Figure 5:
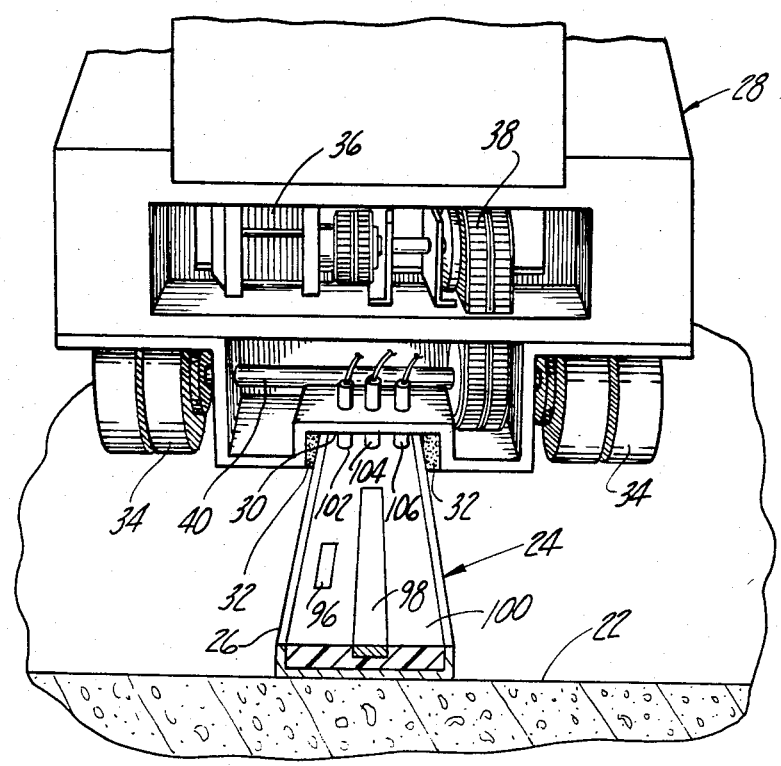
FIG. 5 is a fragmentary sectional view on an enlarged scale taken generally along the line 5—5 in FIG. 4.

Referring to the drawings, FIGS. 2-4 illustrate a material finishing line, which may be a metal plating line for example, as comprising a plurality of tanks 10 of suitable size disposed in a linear array and containing appropriate finishing solutions. A plurality of carriers 12 are provided for suspending workpieces within tanks 10 in racks or barrels as may be appropriate. Pickup adapters 14 are mounted at opposed ends of each carrier 12 for cooperation with the hoist mechanism 16 of the present invention for transferring workpieces among the various tanks 10 and to the load/unload station 18 (FIG. 2). Tanks 10 are positioned by the I-beams 20 (FIG. 3) above a flat support base 22, which would typically comprise a concrete plant floor. It will be appreciated, of course, that the finishing line illustrated in the drawings is exemplary. An elongated track 24 (FIGS. 1-5) is affixed to floor 22 at a position laterally spaced from the linear array of finishing tanks 10 and extends longitudinally parallel to the tank array. As best seen in FIG. 5, track 24 includes one or more continuous lengths of U-shaped channel section 26 placed end-to-end, each section having a flat central portion affixed to floor 22 as by suitable bolts (not shown) and spaced parallel flanges projecting upwardly from the surface of floor 22.

Figure 9:
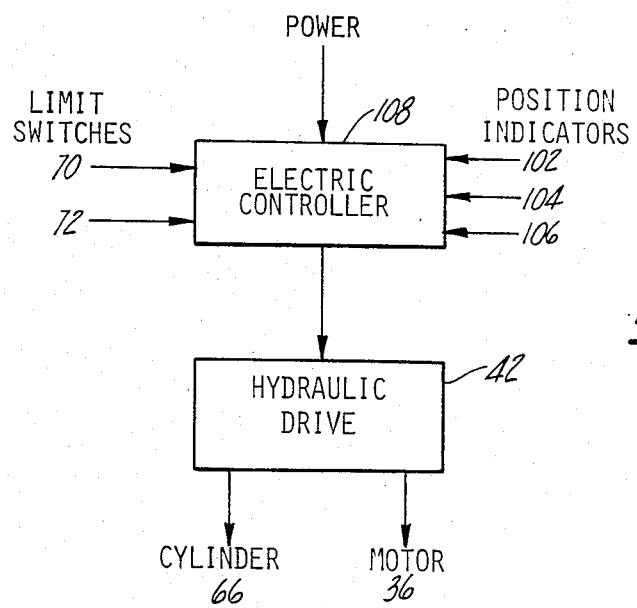
FIG. 9 is a functional block diagram of the electric and hydraulic power and control circuitry for operating the hoist in accordance with the invention.

Hoist mechanism 16 includes a hollow base 28 supported on floor 22 by wheels 34. A hydraulic motor 36 (FIG. 5) is coupled to a wheel drive shaft 40 by a chain drive 38. A hydraulic pump, reservoir and valving system 42 (FIGS. 4 and 9) is also included within base 28. System 42 may be of any suitable construction and is not shown in detail in the drawings. A longitudinal rectangular passage 30 (FIG. 5) extends through base 28 between wheels 34. Track channel 26 is slidably guided through passage 30 by the bearing elements 32 which engage the track side flanges. Thus, base 28 is adapted to be propelled along floor 22 along a linear path defined by track 24. A guide assembly 44 is rigidly mounted on base 28 and projects vertically upwardly therefrom, as best shown in FIGS. 1, 3 and 4. Guide assembly 44 includes a pair of hollow rectangular tubes 46,48 of steel or other suitable rigid construction affixed at their lower ends to base 28 and extending upwardly therefrom to an interconnection bridge or cap 50. Fixed guide tubes, or guide ways, 46, 48 are parallel to each other and are laterally spaced from each other in a direction perpendicular to the longitudinal dimension of track 24. A warning lamp 52 (FIGS. 3 and 4) is mounted on cap 50.

A pick-up arm 54 is vertically slidably mounted on guide assembly 44 and is cantilevered therefrom so as to project over the finishing tank array and pass over successive tanks 10 as base 28 is propelled along track 24. Pick-up arm 54 includes a pair of side plates 56,58 (FIG. 8) spaced from each other on opposite longitudinal sides of fixed guide tubes 46,48. Side plates 56,58 have the strengthening plates 60 secured thereto and projecting therebetween so as to enclose the respective guide tubes 46,48. A plurality of bearing elements 62 are mounted on side plates 56 and the strengthening plates 60 to facilitate sliding motion of arm 54 along fixed support tubes 46,48. Bearing elements 32 (FIG. 5) and 62 (FIG. 8) may comprise suitable ultrahigh molecular weight polymer material. A pair of outwardly oppositely projecting pick-up hands 64 (FIGS. 1 and 3) are rigidly and fixedly suspended from the end of pick-up arm 54 remote from guide assembly 44 and cooperate with the pick-up adapters 14 for raising, lowering and transporting of workpieces suspended from carrier 12. Arm 54 is preferably of welded steel or other suitable rigid construction. An hydraulic ram or piston 66 is coupled at one end to base 28 and at the opposing end to arm 54 at a position between guide assembly 44 and pick-up hands 64. Cylinder 66 is connected by the hoses 68 (FIG. 1) to hydraulic system 42 (FIGS. 4 and 9) for selectively raising and lowering pick-up arm 54 with respect to guide assembly 44 and base 28. A pair of limit switches 70,72 (FIG. 1) are mounted on a bar 74 adjacent to guide assembly 44 for detecting motion of arm 54 to the fully raised and fully lowered positions respectively.

Figure 6:
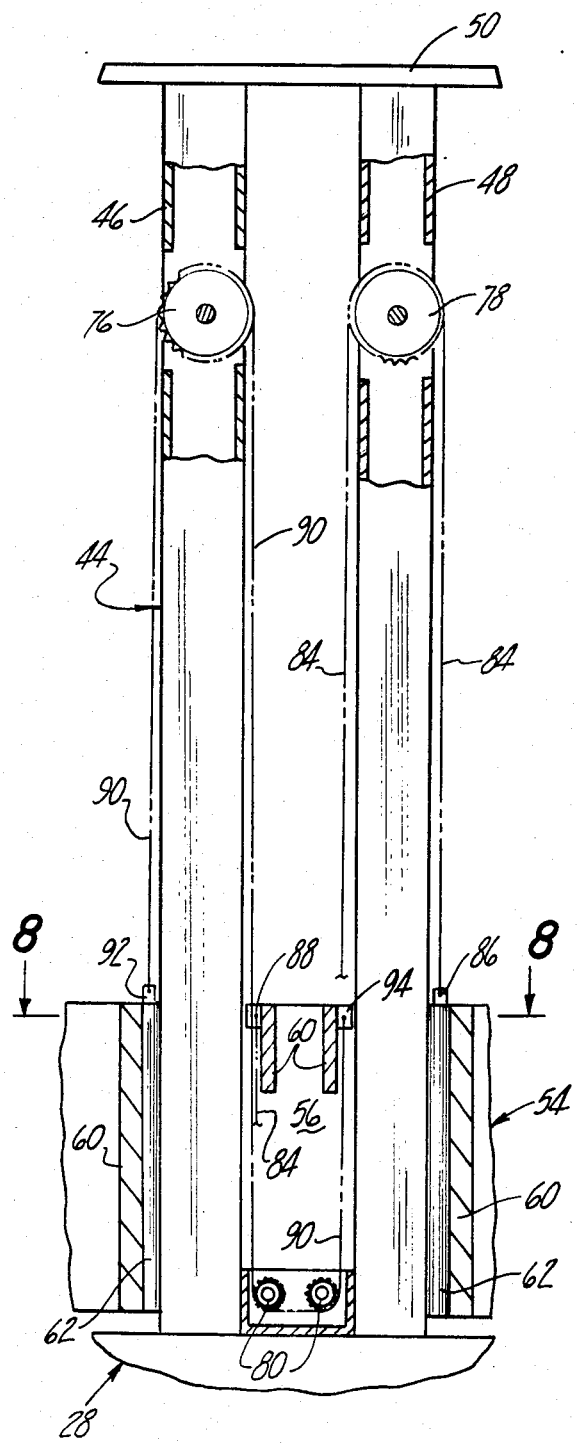
FIG. 6 is a partially sectioned fragmentary end elevational view on an enlarged scale taken generally along the line 6—6 in FIG. 4.
Figure 7:
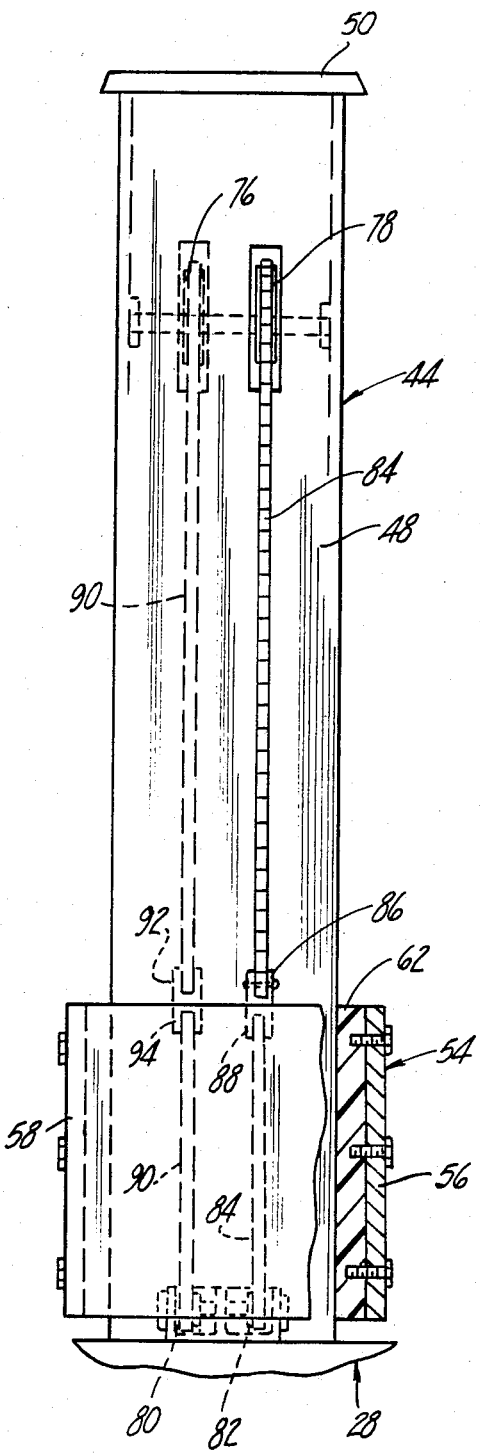
FIG. 7 is a side elevational view of the structure shown in FIG. 6.

In addition to fixed guide tubes 46,48, guide assembly 44 further includes a flexible guide mechanism for maintaining horizontal orientation of pick-up arm 54 during the raising and lowering operations independently of pick-up load (within design limits). More specifically, a pair of idler sprockets 76,78 are mounted within respective fixed support tubes 46,48 to rotate around horizontally parallel axes adjacent to cap 50 and above the upper position of pick-up arm 54 as defined by limit switch 70. As best seen in FIG. 7, the planes of rotation of sprockets 76,78 are spaced from each other in the longitudinal direction of track 24. A second pair of idler sprockets 80 are fixedly mounted in horizontally spaced relation on base 28 between guide tubes 46,48 to rotate freely in the plane of sprocket 76. Likewise, a third pair of idler sprockets 82 (FIGS. 7 and 8) are mounted on base 28 in horizontally spaced relation between guides 46,48 to rotate freely in the plane of sprocket 78. Sprockets 80,82 are mounted on base 28 beneath the fully lowered position of pick-up arm 54 as defined by limit switch 72 (FIG. 1). A first chain 84 (FIGS. 1 and 6–8) is affixed at 86 (FIGS. 6 and 7) to pick-up arm 54 externally of guide 48 and is trained upwardly over sprocket 78 through guide 48, downwardly around sprockets 82 on base 28 and then upwardly to be affixed at 88 (FIGS. 6–8) to arm 54 between guides 46,48. Likewise, a second chain 90 (FIGS. 1, 4 and 6–8) is affixed at 92 (FIGS. 6 and 7) to arm 54 exteriorly of guide tube 46 and is trained upwardly therefrom around sprocket 76 through guide 46, downwardly between guides 46,48 around sprockets 80 and then upwardly to be affixed at 94 (FIGS. 6–8) to arm 54 between guides 46,48. Thus, as arm 54 is propelled by ram 66 upwardly and downwardly along fixed guide tubes 46,48, chains 84,90, which are essentially inextensible, cooperate with the various idler sprockets 76,78 and 80,82 for maintaining arm 54 in essentially horizontal orientation.

In order to identify the position of hoist mechanism 16 relative to the prespecified work positions or locations along the linear array of finishing tanks 10, position indicating means are provided on track 24 and hoist base 28. More specifically, and referring in particular to FIG. 5, a plurality of longitudinally extending and laterally spaced metal strips 96,98 are mounted on a block 100 of insulating material and positioned within track channel 26 between the track side flanges. A corresponding plurality of electromagnetic proximity detectors 102,104 and 106 are carried by base 28 and project into passage 30. The laterally spaced positions of detectors 102,104 and 106 correspond to the predetermined laterally spaced positions of the metal strips at each predetermined tank location, it being appreciated that at the particular location illustrated in FIG. 5 there is no metal strip corresponding to the lateral position of detector 106. Preferably, detectors 104,106 are responsive to presence or absence of corresponding metal strips, e.g. metal strip 98 in FIG. 5, for identifying the associated predetermined work location in the finishing line. Detector 102 is responsive to a corresponding strip 96 at each predetermined location for arresting motion of hoist mechanism 16. Preferably, the strips, such as strip 98, to which pick-ups 104,106 are responsive are substantially longer than are the strips 96 associated with detector 102, so that the control electronics 108 (FIG. 9) to which the detectors are connected may slow propulsion of hoist mechanism 16 as the hoist approaches the programmed halt location, and then halt propulsion at the location indicated by detectors 104,106 when detector 102 comes into proximity with strip 96.

An electrical power control box 110 (FIG. 1) may be positioned at any suitable location along the finishing line and connected to hoist 16 by a flexible power cable. Preferably, the power cable is encased in a flexible protective carrier 112 which will fold upon itself and thereby follow hoist mechanism 16 as the latter travels along track 24 adjacent to the finishing line tanks. Control electronics 108 (FIG. 9) which may comprise any suitable so-called programmable controller, may be located in power box 110 or, more preferably, carried within base 28. A door 114 (FIGS. 1 and 4) in base 28 affords access to programmable controller 108 illustrated functionally in FIG. 9. Likewise, a door 116 in base 28 affords access to hydraulic motor 36 for purposes of maintenance, and a door 118 (FIGS. 3 and 4) affords access to hydraulic pump, reservoir and valve system 42 for maintenance purposes. A manual control box 120 is connected by the cable 122 (FIGS. 3 and 4) for overriding programmed control in specific situations where appropriate.

In the lowered position of arm 54 shown in solid lines in FIG. 3, pick-up hands 64 are positioned beneath the plane of the adapters 14 on the several carriers 12. In this position, hoist 16 may translate the length of the track array without engaging any of the carriers to the pre-programmed position indicated by detectors 104,106 (FIGS. 5 and 9), at which point the hoist is halted. With base 28 at rest, arm 54 may then be lifted to the raised position illustrated in phantom in FIG. 3. During such lifting operation, hands 64 engage adapters 14 to lift carrier 12 and the associated workpieces. In the fully raised position, the workpieces are held sufficiently high to permit passage above the carriers 12 in adjacent tanks, so that the hoist may again be propelled along track 24 to a new position at which the transported load is deposited in a new tank location by lowering arm 54. This sequence is repeated as desired to transfer the workpieces among the various tanks.

As shown in FIG. 2, two (or more) hoist mechanisms 16 may share a single track 24. Of course, the hoists must be programmed so as not to interfere with each other, so that in multiple hoist applications it may be preferable to provide one programmable controller 108 (FIG. 9) operating all of the hoist mechanisms. It will be noted that the hoist of the invention removes all active components, particularly electrically powered components, from over the tank array. This feature enhances safety against shock and explosion. Another important feature of the invention lies in its adaptability for upscaling or down-scaling as desired for specific applications. In this connection, for lifting particularly heavy loads, it may be desirable to add weights to arm 54 at an end thereof remote from hands 64.

From the foregoing description, it will be appreciated that one important aspect of the present invention contemplates an improved hoist mechanism in a material finishing line. In this connection, directional language in the following claims, such as "longitudinal" or "lateral" are taken with reference to the longitudinal or linear dimension of the array of tanks in the finishing line.

The invention claimed is:

1. A material finishing line comprising a plurality of tanks disposed in a linear array and adapted to contain material finishing solutions, carrier means for suspending material in said tanks, elongated tracks means disposed in a fixed position laterally spaced from and extening parallel to said linear array, and a self-propelled hoist comprising a base including drive means for propelling said base lengthwise of said track means, guide means fixedly projecting vertically from said base only in an upward direction, a sole pick-up arm carried by said guide means for vertical motion with respect to said base and cantilevered from said guide means over said array so as to pass over said plurality of tanks as said base is propelled along said track means, means coupling said arm to said base for bodily moving said arm between raised and lowered positions with respect to said guide means and said base, and means rigidly suspended from said arm over said array and adapted to cooperate with said carrier means for selectively lifting carrier means and materials suspended from said carrier means and transporting said carrier means and materials suspended from said carrier means longitudinally above said tanks.

2. A material finishing line comprising a plurality of tanks disposed in a linear array and adapted to contain material finishing solutions, carrier means for suspending material in said tanks, elongated track means adapted to be fixedly disposed on a base floor laterally spaced from and extending parallel to said linear array, and a self-propelled hoist comprising a base including drive means for propelling said base lengthwise of said track means, guide means fixedly projecting vertically upward from said base, a pick-up arm carried by said guide means for vertical motion with respect to said base and cantilevered from said guide means over said array so as to pass over said plurality of tanks as said base is propelled along said track means, means coupling said arm to said base for bodily moving said arm between raised and lowered positions with respect to said guide means and said base, and means rigidly suspended from said carrier means for selectively lifting said carrier means and material suspended from said carrier means and transporting said carrier means and material suspended from said carrier means longitudinally above said tanks.

3. The finishing line set forth in claim 21 wherein said base includes means for cooperating with said track means for confining motion of said base to a linear path parallel to said array.

4. The finishing line set forth in claim 3 wherein said track comprising a metal channel having a flat base adapted to be affixed to said base floor and laterally spaced side flanges projecting upwardly from said base, and wherein said base includes means for cooperating with said side flanges to confine said base motion to said linear path.

5. The finishing line set forth in claim 4 wherein said tanks are disposed at predetermined locations in said array, and wherein said finishing line further includes position indicating means carried at fixed longitudinally spaced positions on said track means corresponding to said predetermined locations in said array and means carried by said base for cooperating with said position indicating means to identify locations of said hoist along said track means relative to said tank locations.

6. The finishing line set forth in claim 5 wherein said position indicating means comprises a block of insulating material positioned within said metal channel, and metallic strip means carried by said insulating block as positions coordinated with said predetermined locations, and wherein said means carried by said base comprises proximity detection means responsive to said metallic strip means.

7. The finishing line set forth in claim 3 wherein said coupling means comprises linear drive means extending between said base and said arm, and coupled to said arm between said guide means and said means rigidly suspended from said arm.

8. The finishing line set forth in claim 7 further comprising switch means responsive to motion of said arm and coupled to said linear drive means to arrest vertical motion of said arm at said upper and lower positions.

9. The finishing line set forth in claim 7 wherein said guide means comprises fixed means for slidably guiding motion of said arm.

10. The finishing line set forth in claim 9 wherein said guide means further comprises flexible means extending between said base and said arm for maintaining orientation of said arm during said vertical motion.

11. The finishing line set forth in claim 10 wherein said flexible means comprises first sprocket means fixedly carried for free rotation on said fixed guide means, second sprocket means fixedly carried for free rotation on said base adjacent to said fixed guide means, and chain means having ends affixed to said arm and an intermediate portion between said ends trained over said first and second sprocket means.

12. The finishing line set forth in claim 11 wherein said fixed guide means comprises a pair of fixed guide ways spaced from each other lengthwise of said arm, said ways extending interiorly upwardly through said arm; wherein said first sprocket means comprises first and second sprockets spaced from each other in the longitudinal direction of said track means and respectively disposed on said first and second ways above said upper position of said arm; wherein said second sprocket means comprises third and fourth sprockets mounted on said base between said ways and respectively coplanar with said first and second sprockets; and wherein said chain means comprises a first chain affixed at one end to said arm exteriorly of said first way and trained around said first and third sprockets to a second end affixed to said arm between said ways, and a second chain affixed at one end to said arm exteriorly of said second way and trained around said second and fourth sprockets to a second end affixed to said arm between said ways.

13. A free standing hoist apparatus for lifting, transporting and depositing work loads among a plurality of material finishing locations disposed in a linear array along a base floor, with each said work load including carrier means, said hoist apparatus comprising elongated track means adapted to be fixedly positioned on said base floor parallel to and laterally spaced from said array to guide the remainder of said hoist apparatus and said work loads and a self-propelled hoist mechanism supported and guided by said track means and the floor including a base with drive means for propelling said base only horizontally along said base floor and means cooperating with said track means for confining propulsion of said base to a path lengthwise of said track means, guide means fixedly projecting vertically upwardly from said base, a pick-up arm carried by said guide means for vertical motion with respect to said base and cantilevered from said guide means over said array so as to pass successively over said plurality of locations as said base is propelled along said path, said pick-up arm only capable of rectilinear movement, pick-up means rigidly suspended from an end of said arm remote from said guide means and above said array for selectively engaging said carrier means, and means coupling said arm to said base for moving said arm only vertically along said guide means between a lowered position in which said pick-up means only capable of rectilinear movement is disposed to pass beneath said carrier means as said hoist mechanism is propelled along said path and a raised position in which said arm and said pick-up means are adapted to support said carrier means and said work load for transportation above said locations.

14. The hoist apparatus set forth in claim 13 further comprising control means coupled to said arm-moving means and said propelling means for selectively raising and lowering said arm and for selectively propelling said hoist mechanism along said path in both said raised and said lowered positions of said arm.

15. The hoist apparatus set forth in claim 13 wherein said coupling means comprises linear drive means extending between said base and said arm and coupled to said arm between said guide means and said means rigidly suspended from said arm.

16. The hoist apparatus set forth in claim 15 wherein said guide means comprises fixed means for slidably guiding motion of said arm between said raised and lowered positions.

17. The hoist apparatus set forth in claim 16 wherein said guide means further comprises flexible means extending between said base and said arm for maintaining orientation of said arm during motion between said raised and lowered positions.

18. The hoist apparatus set forth in claim 17 wherein said flexible means comprises first sprocket means fixedly carried for free rotation on said fixed guide means, second sprocket means fixedly carried for free rotation on said base adjacent to said fixed guide means, and chain means having ends affixed to said arm and an intermediate portion between said ends trained over said first and second sprocket means.

19. The hoist apparatus set forth in claim 18 wherein said fixed guide means comprises a pair of fixed guide ways spaced from each other lengthwise of said arm, said ways extending interiorly upwardly through said arm; wherein said first sprocket means comprises first and second sprockets spaced from each other in the longitudinal direction of said track means and respectively disposed on said first and second ways above said upper position of said arm; wherein said second sprocket means comprises third and fourth sprockets mounted on said base between said ways and respectively coplanar with said first and second sprockets; and wherein said chain means comprises a first chain affixed at one end to said arm exteriorly of said first way and trained around said first and third sprockets and to a second end affixed to said arm between said ways, and a second chain affixed at one end to said arm exteriorly of said second way and trained around said second and fourth sprockets to a second end affixed to said arm between said ways.

20. Hoist apparatus for lifting, transporting, and depositing work loads among a plurality of locations disposed in a linear array along a base floor, with each of said work loads including carrier means, said hoist apparatus comprising elongated track means adapted to be fixedly positioned on said base floor parallel to and laterally spaced from said array, and a self-propelled hoist mechanism including a base with drive means for propelling said base along said base floor and means cooperating with said track means for confining propulsion of said base to a path lengthwise of said track means, fixed guide means projecting vertically upward from said base including first and second guide ways spaced from each other laterally from said track, a pick-up arm carried by said guide ways for vertical motion between upper and lower positions with respect to said base and cantilevered from said guide ways over said array so as to pass successively over said plurality of locations as said base is propelled along said path, flexible means for maintaining the orientation of said arm including first and second sprockets spaced from each other in a longitudinal direction of said track means and respectively disposed on said first and second ways above said upper position of said arm, third and fourth sprockets mounted on said base between said first and second ways and respectively coplanar with said first and second sprockets; chain means comprising a first chain affixed at one end to said arm exteriorly of said first way and trained around said first and third sprockets to a second edd affixed to said arm between said first and second ways, and a second chain affixed at one end to said arm exteriorly of said second way and trained around said second and fourth sprockets to a second end affixed to said arm between said first and second ways, pick-up means rigidly suspended from an end of said arm remote from said guide means and above said array for selectively engaging said carrier means, coupling means comprising linear drive means extending between said base and said arm and coupled to said arm between said guide means and said pick-up means for bodily moving said arm with respect to said guide means and said base between a lowered position in which said pick-up means is disposed to pass beneath the carrier means as said hoist mechanism is propelled along said path and a raised position in which said arm and said pick-up means are adapted to support said carrier means and said work load for transportation above said locations, control means coupled to said linear drive means and said base drive means for selectively raising and lowering said arm and for selectively propelling said hoist mechanism along said path in both said raised and said lowered positions of said arm, and position indicating means carried at fixed longitudinally spaced positions on said track means corresponding to individual ones of said plurality of locations, and mean carried by said base for cooperating with said position indicating means to identify locations of said hoist mechanism along said track means relative to said plurality of locations.

* * * * *